United States Patent [19]

Norton et al.

[11] 3,946,811

[45] Mar. 30, 1976

[54] POLYALKENE OXIDE PRESLUG FOR PROTECTING DISPLACEMENT FLUIDS FROM POLYVALENT IONS

[75] Inventors: Charles J. Norton; David O. Falk, both of Denver, Colo.

[73] Assignee: Marathon Oil Company, Findlay, Ohio

[22] Filed: Nov. 25, 1974

[21] Appl. No.: 526,552

[52] U.S. Cl. .............................. 166/274; 166/305 R
[51] Int. Cl.² .......................................... E21B 43/16
[58] Field of Search ........ 166/273, 274, 275, 305 R; 252/8.55 D

[56] References Cited

UNITED STATES PATENTS

| 2,233,381 | 2/1941 | DeGroote et al. | 166/305 R |
|---|---|---|---|
| 3,018,826 | 1/1962 | Sandiford | 166/273 |
| 3,520,365 | 7/1970 | Jones | 166/273 |
| 3,523,581 | 8/1970 | Murphy | 166/273 |
| 3,532,166 | 10/1970 | Williams | 166/275 |
| 3,580,337 | 5/1971 | Gogarty et al. | 166/274 |
| 3,634,305 | 1/1972 | Johnson et al. | 166/275 |
| 3,692,113 | 9/1972 | Norton et al. | 166/275 |
| 3,783,944 | 1/1974 | Jennings et al. | 166/273 |
| 3,804,173 | 4/1974 | Jennings | 166/275 |
| 3,882,939 | 5/1975 | McAtee et al. | 166/273 |

FOREIGN PATENTS OR APPLICATIONS

| 652,727 | 11/1962 | Canada | 252/8.55 D |
|---|---|---|---|
| 698,933 | 12/1964 | Canada | 166/274 |

OTHER PUBLICATIONS

Marathon Oil Technical Disclosure Bulletin, Rhudy, "Delayed Viscous Waterflooding", 12/1970.

*Primary Examiner*—Ernest R. Purser
*Assistant Examiner*—Jack E. Ebel
*Attorney, Agent, or Firm*—Joseph C. Herring; Jack L. Hummel

[57] ABSTRACT

A preslug of polyalkene oxide, e.g., polyethylene oxide, is injected before injection of a displacement fluid, e.g., a micellar dispersion or thickened water, in order to prevent contact between the displacement fluid and polyvalent, e.g., divalent and trivalent ions in the formation water, which ions are detrimental to many displacement fluids.

10 Claims, No Drawings

POLYALKENE OXIDE PRESLUG FOR PROTECTING DISPLACEMENT FLUIDS FROM POLYVALENT IONS

BACKGROUND OF THE INVENTION

1. Field of the Invention

This invention relates primarily to processes classified in Class 166 of the United States Patent Office, and more particularly to the production of earth fluids by displacement fluids.

2. Description of the Prior Art

U.S. Pat. No. 3,482,631 teaches injecting an aqueous preslug containing a viscosity imparting agent, e.g., high molecular weight polymers such as partially hydrolyzed polyacrylamides, biopolymers, e.g., polysaccharides, and other similar materials, and electrolyte and/or semipolar organic compounds.

U.S. Pat. No. 3,324,944 teaches injecting a nonpolar organic liquid preslug, e.g., hydrocarbons that are fluid under formation conditions, preferably with a viscosity about that of the crude (low viscosity hydrocarbons such as propane, butane, and straight run gasoline, thickened by agents such as polyisobutylenes) into the formation to improve the stability of subsequent microemulsion injection into the formation.

U.S. Pat. No. 3,343,597 teaches injecting an aqueous slug of controlled ion content into the formation prior to the injection of the micellar dispersion. The micellar system is thus protected from ions in formation water during the secondary type oil recover.

U.S. Pat. No. 3,698,479 teaches injecting oil external micellar solution which comprises in part a cosurfactant such as ethylene oxide. The viscosity of the slug increases from its leading edge to its trailing edge.

U.S. Pat. No. 3,692,113 teaches use of polyalkene oxide polymer solutions with added metal ions to provide increased flow resistance.

SUMMARY OF THE INVENTION

General Statement of the Invention

Divalent and trivalent ions are detrimental to certain petroleum displacement fluids, e.g., those that contain anionic or cationic surfactants such as water-surfactant fluids for "surfactant floods", emulsions for "emulsion floods", and micellar systems for high-efficiency flooding with soluble oils; as these ions are also detrimental to water solutions of mobility control agents, e.g., biopolymers such as polysaccharides, polyacrylamides, particularly the high molecular weight, partially-hydrolyzed polyacrylamides, e.g., those sold under the Dow Chemical Company trademark, "Pusher", polyalkene oxides different from the one used in the preslug and modifications and derivatives of the foregoing.

The inventors have discovered that polyethylene oxide is able to interact with polyvalent cations, e.g., divalent and trivalent cations such as calcium, magnesium, strontium, barium, ferric, manganese, chromic, aluminium, and rare earths.

While the inventors are unable to definitely state the exact mechanism of their invention and do not wish to be bound by any particular hypothesis, it seems likely that the present invention works primarily by weak associated bonds between such deleterious polyvalent cations and the dipolar sites on the comparatively much larger polyalkene oxide polymer molecule.

The polyalkene oxides are described in more detail below. Generally the preslug of polyalkene oxide-water will be injected in quantities of from about 0.01 to about 1.00, more preferably from about 0.025 to about 0.50, and most preferably from about 0.05 to about 0.10 PV, based on the pore volume of the reservoir being flooded.

Additional information is available in the article entitled, "Reservoir Brines Influence Soluble-Oil Flooding Processes", by L. W. Holm and V. A. Josendal, *Oil and Gas Journal*, Vol. 70, No. 46, p. 158, Nov. 13, 1972, and from the descriptions of polyalkene oxide and techniques in U.S. Pat. No. 3,692,113 issued Sept. 19, 1972, to the present inventors.

Utility of the Invention

The present invention is primarily useful in the displacement of petroleum from formations and can be used in secondary recovery in which the recovery is increased by use of displacement, or in tertiary recovery (utilized after the field has been water flooded). The invention is primarily useful in increasing the efficiency of the displacement fluid by preventing its contact with deleterious polyvalent ions. This permits both an increased spacing between the injection and the recovery well, and also in many instances reduces the quantities of chemicals in the displacement fluids.

The inventors know of no U.S. patent application which relates to the present invention except Ser. No. 359,816 filed May 14, 1973, by Richard W. McAtee and Marvin A. Svaldi and entitled "Mobility Control in Adjacent Wellbores" and now U.S. Pat. No. 3,882,939. This application relates to the use of polyalkene oxide polymer *within* the front portion of an aqueous bipolymer solution used for displacement of petroleum and not a separate preslug of aqueous polyalkene oxide, as taught by the present invention.

DESCRIPTION OF THE PREFERRED EMBODIMENTS

Starting Materials

Polyalkene Oxide: The polyalkene oxides are most preferably poly lower alkene oxides and can include polyethylene oxide, polypropylene oxide, mixed copolymers of polyethylene oxide and polypropylene oxide, and mixtures of the foregoing. The preferred polyalkene oxides have molecular weights of from about $10^4$ to about $10^8$, more preferably from about $10^5$ to about $10^7$, and most preferably from about $1.0 \times 10^6$ to about $6.0 \times 10^6$. Preferably, the polyalkene oxides will be present in the aqueous solutions in amounts of from about 0.001 to about 10.0, more preferably from about 0.01 to about 1.0 and most preferably from 0.05 to about 0.5 weight percent based on the weight of the total solution. Polyalkene oxides which are commercially available, e.g., from Union Carbide Corporation under the trade name, "Polyox" are suitable for use with the invention. Various commercial polyalkene oxides are described in Union Carbide Corporation Bulletin F-40246E, 10M-1968. Mixed polyethylene-polypropylene oxides are described in Wyandott Chemical Company Bulletin F-3018R. Factors influencing mobility control by polymer solutions are discussed in paper number SPE-2867 of the Society of Petroleum Engineers of the American Institute of Mining and Metallurgical Engineers.

Water: The water used with the present invention may be conate water, e.g., weakly saline Palestine line water, fresh water, or brackish water or mixtures thereof. It is preferable that the water contain less than about 300,000, more preferably less than about 100,000, and most preferably less than about 20,000 ppm but more than 1000 ppm of dissolved solids (e.g., invention works best in Henry Plant Water).

While not necessary to the practice of the present invention, various other ingredients including, among others, cellulose derivatives, surfactants, e.g., alkaryl sulfonates and other conventional fluid displacement additives may be added to the liquid polymer solution. In addition to polyalkene oxides, other viscosity increasing agents, e.g., carboxymethyl cellulose, polyacrylamides, partially-hydrolyzed polyacrylamides, polyvinylpyrrolidone and polysaccharides may be employed.

Examples: Two conventional floods with partially hydrolyzed polyacrylamide (Dow 700) thickener uniformly dissolved in Palestine water (low salinity water from the Palestine Lease in Crawford County, Illinois, U.S.A.) are made in 3-inch diameter by 4-foot long Berea sandstone cores using standard procedures of core flooding (see, e.g., U.S. Pat. No. 3,692,113).

The Berea sandstone cores are initially saturated with Henry brine ($O_i$), then saturated with Henry crude oil both from the Henry Lease, Crawford County, Illinois, to the initial oil saturation. The cores are then subsequently primary waterflooded with Henry brine to residual saturation ($O_r$).

EXAMPLES I AND II

No polyethylene oxide preslug is used in these experiments. A 0.02 PV micellar solution is injected which is followed by 1.0 PV of 500 ppm Dow 700 which gave a residual oil recovery of 66.0 and 66.1 percent in repeat experiments.

EXAMPLE III

A core is prepared in the usual manner and waterflooded to residual oil saturation. A 0.1 PV of 500 ppm polyethylene oxide preslug formulated in Palestine water (soft water) is injected into the core followed by 0.02 PV micellar slug. This is followed by 1.0 PV 500 ppm Dow 700 which gave a residual oil recovery of 51.6 percent.

EXAMPLES IV AND V

Two cores are prepared in the usual manner and waterflooded to residual oil saturation. A 0.1 PV 500 ppm polyethylene oxide preslug formulated in Henry plant water (hard water) is injected into each core, followed by 0.02 PV micellar slug. This is followed with 1.0 PV 500 ppm Dow 700 which gave a residual oil recovery of 73.5 and 71.1 percent.

MODIFICATIONS OF THE INVENTION

It is intended that all equivalents obvious to those skilled in the art be incorporated within the scope of the invention as defined within the specification and appended claims.

TABLE 1

POLYETHYLENE OXIDE IN HARD WATER IMPROVES SURFACTANT-THICKENED WATER SUPPLEMENTAL OIL RECOVERY[1]

| Examples | Core Data | | | Preparative Waterflood % Pore Volume (PV) | | | | | Thickener ppm | Total Thickened Water Recovery | |
| --- | --- | --- | --- | --- | --- | --- | --- | --- | --- | --- | --- |
| | PV cc | Porosity % | Permeability md | $O_i$ | $W_i$ | $O_r$ | $W_r$ | % Eff. | | PV | % of $O_r$ |
| I | 535 | 21.7 | — | 333 | 202 | 153 | 382 | 54.1 | No preslug; 500 ppm Dow 700[2] | 1.0 | 66.0 |
| II | 540 | 21.9 | 242 | 336 | 204 | 168 | 372 | 50.0 | No preslug; 500 ppm Dow 700 | 1.0 | 66.1 |
| III | 506 | 20.5 | 198 | 316 | 190 | 161 | 345 | 49.1 | 500 ppm Polyox[3] preslug (PW)[4]; 500 ppm Dow 700 | 1.1 | 51.6 |
| IV | 519 | 20.9 | 205 | 324 | 195 | 158 | 361 | 51.2 | 500 ppm Polyox preslug (HPW)[5]; 500 ppm Dow 700 | 1.1 | 73.5 |
| V | 531 | 21.5 | 180 | 323 | 208 | 157 | 374 | 51.4 | 500 ppm Polyox preslug (HPW); 500 ppm Dow 700 | 1.1 | 71.1 |

[1]Flooding sequence: 0.1 PV 500 ppm preslug, 0.02 PV 119-R slug, 1.0 PV 500 ppm Dow 700 Palestine Water (PW)
[2]A partially hydrolyzed polyacrylamide made by Dow Chemical Company
[3]A polyethylene oxide made by Union Carbide Corporation
[4]Palestine water (PW) contains 500 ppm total dissolved solids.
[5]Henry Plant Water (HPW) contains 18,500 ppm total dissolved solids.

What is claimed is:

1. In processes for displacement of petroleum from polyvalent cation-containing formations by displacement fluids comprising water and a mobility control fluid which substantially decreases the the mobility of said water, wherein said mobility control fluid is not a polyalkeneoxide and is deleteriously affected by contact with polyvalent cation, the improvement comprising injecting into said formation prior to injection of said displacement fluid composition, from 0.01 to about 1.00 pore volumes of a composition comprising water and from about 0.001 to about 10.0 weight percent of polyalkene oxide polymer.

2. The process according to claim 1 wherein the polyalkene oxide polymer has a molecular weight of above 100,000.

3. The processes according to claim 1 wherein said polyalkene oxide polymer is present in a concentration from about 0.005 to about 5 percent by weight, based on the weight of water.

4. The processes according to claim 1 wherein the polyalkene oxide has a molecular weight of from about 1,000,000 to about 10,000,000 prior to said injection.

5. The processes according to claim 1 wherein said polyalkene oxide polymer has a concentration of from about 0.01 to about 1 percent by weight, based on weight of water.

6. The processes according to claim 1 wherein said polyalkene oxide comprises polyethylene oxide.

7. The processes according to claim 1 wherein said polyalkene oxide comprises groups containing the structure:

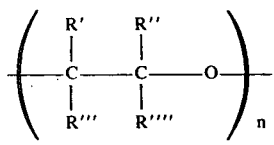

wherein R', R'', R''', and R'''' may be the same or different and are each selected from the group consisting of of hydrogen, alkyl, and containing from 1 to 20 carbon atoms, and n is in the range of about $10^3$ to $10^6$.

8. The process of claim 7, wherein R', R'', R''', and R'''' each contain from 1 to 6 carbon atoms, the balance of the constituents being hydrogen.

9. A process according to claim 1 wherein said mobility control fluid composition comprises: partially hydrolyzed polyacrylamides, biopolymers, mixtures of the foregoing.

10. A process according to claim 1 wherein said polyalkene oxide-containing composition and said mobility control fluid are injected into an injection well and said petroleum is displaced from said formation through a producing well spaced a distance from said injection well.

* * * * *